Figure 1:
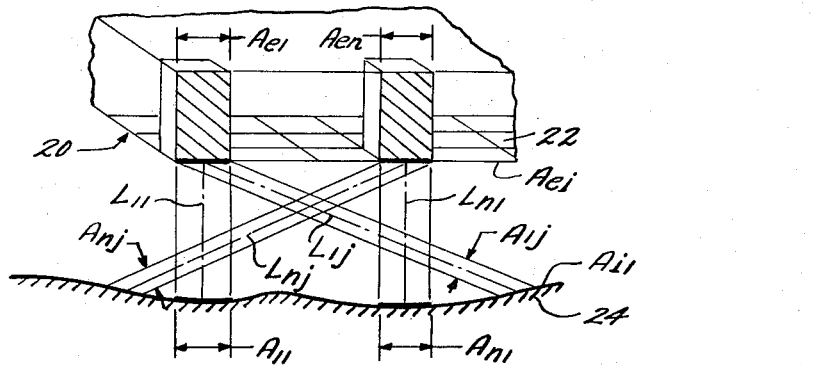

INVENTORS
ALLEN U. JOLLIS
MARCUS A. CUMMINGS
JOSEPH BAYER

BY Lee Hacks

ATTORNEY

Dec. 12, 1967  A. U. JOLLIS ETAL  3,357,906
METHOD OF MAKING A WORKING SURFACE OF A TOOL-ELECTRODE
FOR AN ELECTROCHEMICAL MACHINING APPARATUS
Filed March 1, 1965                           5 Sheets-Sheet 2
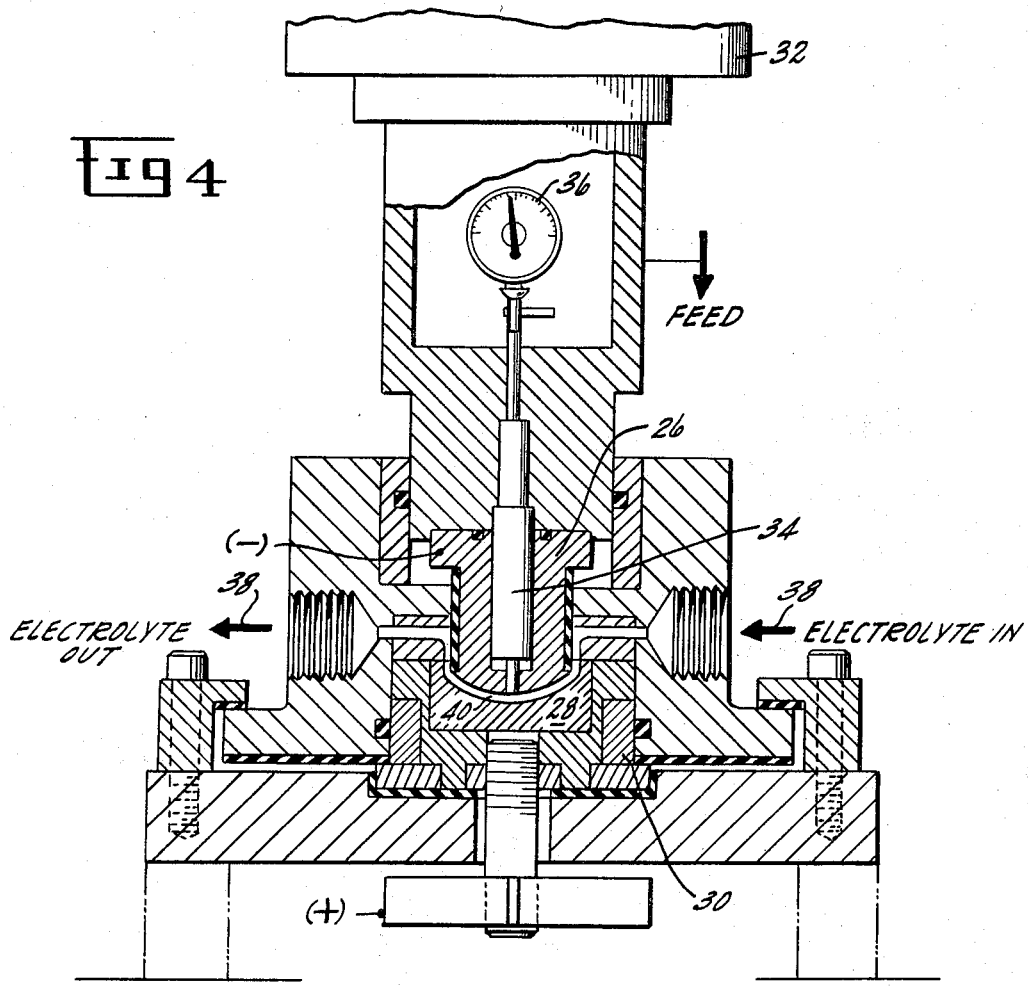
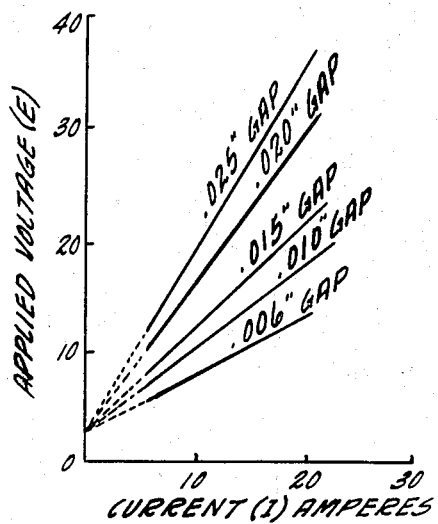
INVENTORS.
ALLEN U. JOLLIS
MARCUS A. CUMMINGS
JOSEPH BAYER
ATTORNEY—

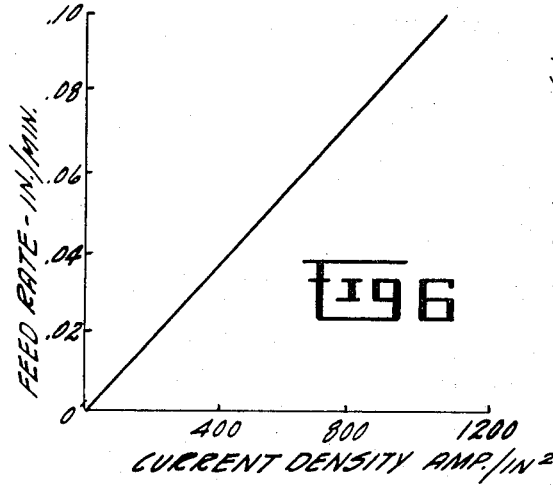
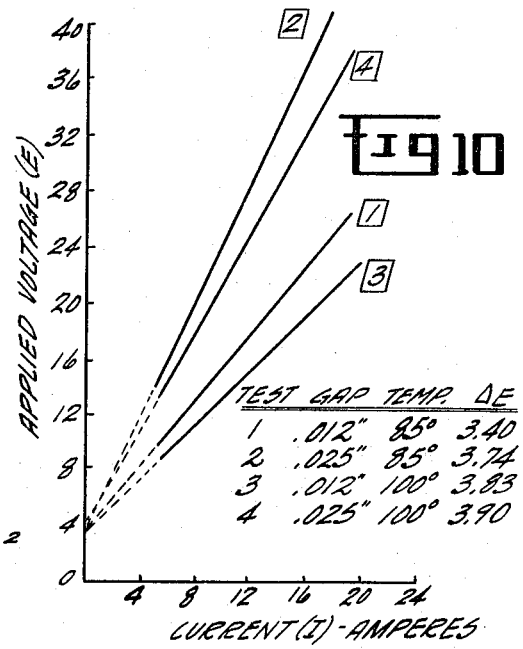
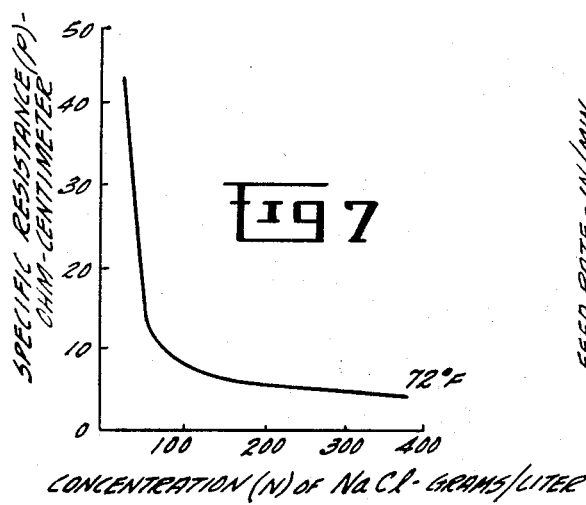
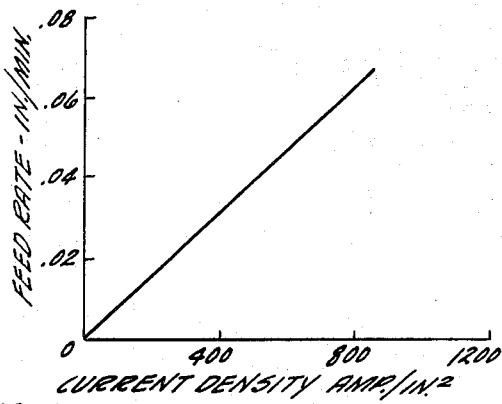
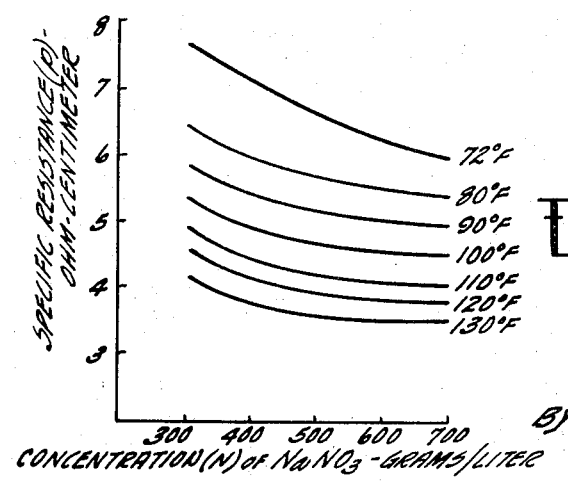
INVENTORS
ALLEN U. JOLLIS
MARCUS A. CUMMINGS
JOSEPH BAVER
BY Lee Hacker
ATTORNEY

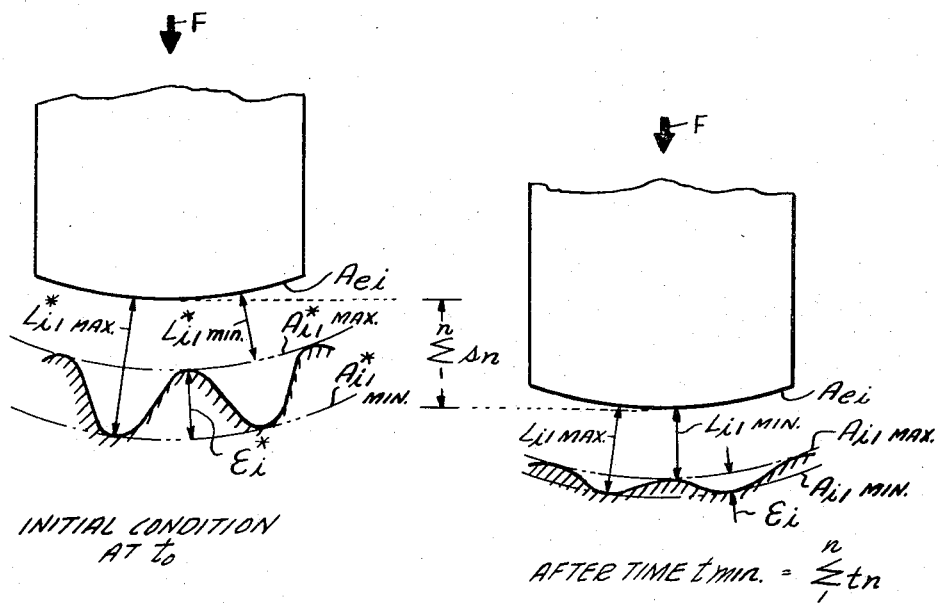

3,357,906
METHOD OF MAKING A WORKING SURFACE OF
A TOOL-ELECTRODE FOR AN ELECTROCHEM-
ICAL MACHINING APPARATUS
Allen Ulrich Jollis and Marcus Augustus Cummings, Cin-
cinnati, and Joseph Bayer, Middletown, Ohio, assignors
to General Electric Company, a corporation of New
York
Filed Mar. 1, 1965, Ser. No. 436,034
10 Claims. (Cl. 204—143)

This invention relates to electrolytic processes and equipment and, more particularly, to a method for controlling equipment and designing electrolytic processes and electrodes based on prediction of the effect of current field.

The application of electrochemistry to the production of articles or article surfaces has resulted in such well known material removal or material adding electrochemical production processes as electroplating, electropolishing, electrolytic machining, and other electrolytic cutting and drilling processes. In such processes, the electrolyte lies or passes between two electrodes, one of which is the workpiece. Then an electric potential is impressed across the electrodes sufficient to cause a flow primarily of direct current between the electrodes to add material to or remove material from a workpiece. These processes and their associated equipment and electrodes are very well known and have been widely studied and described.

However, there exists in such electrochemical processes a wide variety of parameters and process variables, including numerous electrolytes and their associated chemical or flow characteristics, for each electrolyte-workpiece system and for each piece of equipment or electrode shape used. Electrochemists have recognized that because of such a large number of parameters and variables and their complex inter-relationships, control of the process and design of equipment or electrodes, such as anodes or cathodes to cooperate with a workpiece, is extremely difficult. The effect of "throwing power" in electrodeposition as well as in electrolytic material removal heretofore has not been clearly defined. Consequently, electrode design, for example, has been on a modified trial-and-error basis in establishing a particular configuration for a particular electrolyte-workpiece material-equipment situation. A change in either of those three or of other process parameters such as voltage or feed rate (in the case of electrochemical machining) upsets the relationships with no accurate method being available to predict with accuracy the effect that the current field—which does the work—would have on the process.

Therefore, it is a principal object of this invention to provide an improved method for accurately designing and controlling electrochemical processes through the use of known or readily available geometric measurements, process variables and parameters.

Another object is to provide a method for predicting the total effect of current field, including both the direct and stray effect, in electrolytic processes.

A further object is to provide an improved method for maximizing process performance such as metal removal rates.

Still a further object is to provide an improved method for determining excess machining stock in electrolytic machining.

An additional object is to provide an accurate electrode designed by a method using known or readily available geometric measurements, process variables and parameters.

A more specific object is to provide an improved method for accurately designing cathodes for use in electrolytic machining.

These and other objects and advantages will be more readily appreciated and understood from the following detailed description, examples and the drawing all of which are meant to be exemplary of rather than any limitation on the scope of the present invention.

Figure 2:
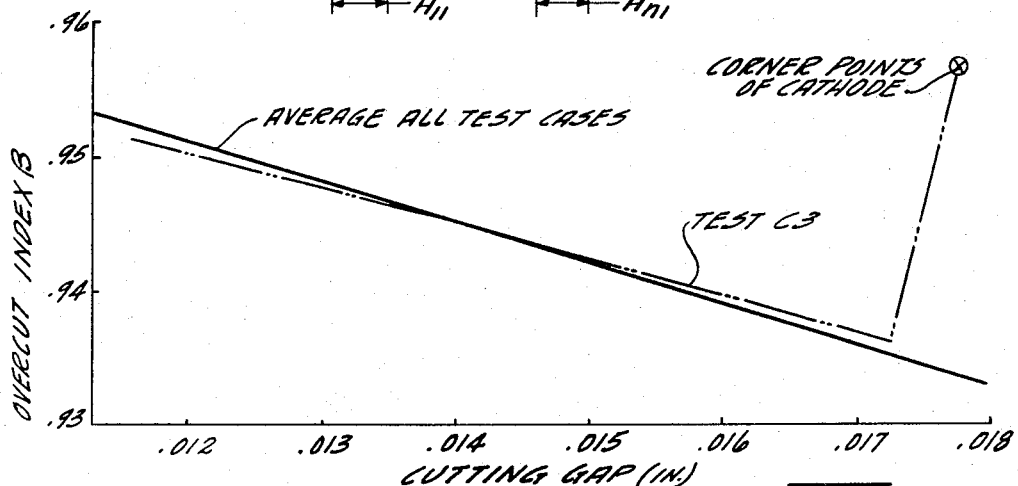
Figure 3:
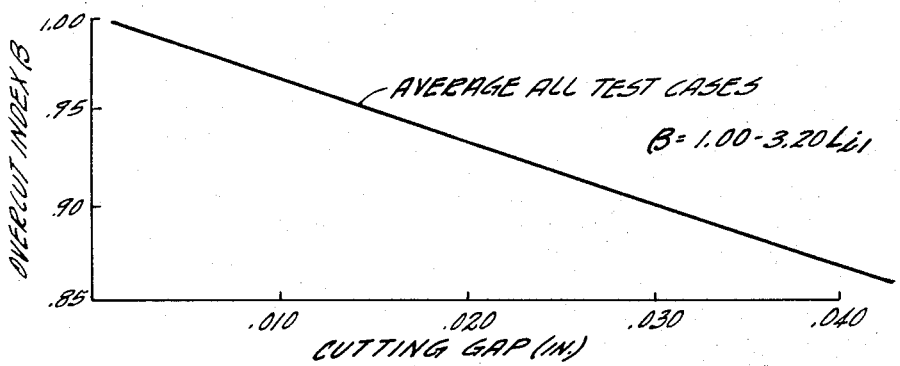
Figure 8:
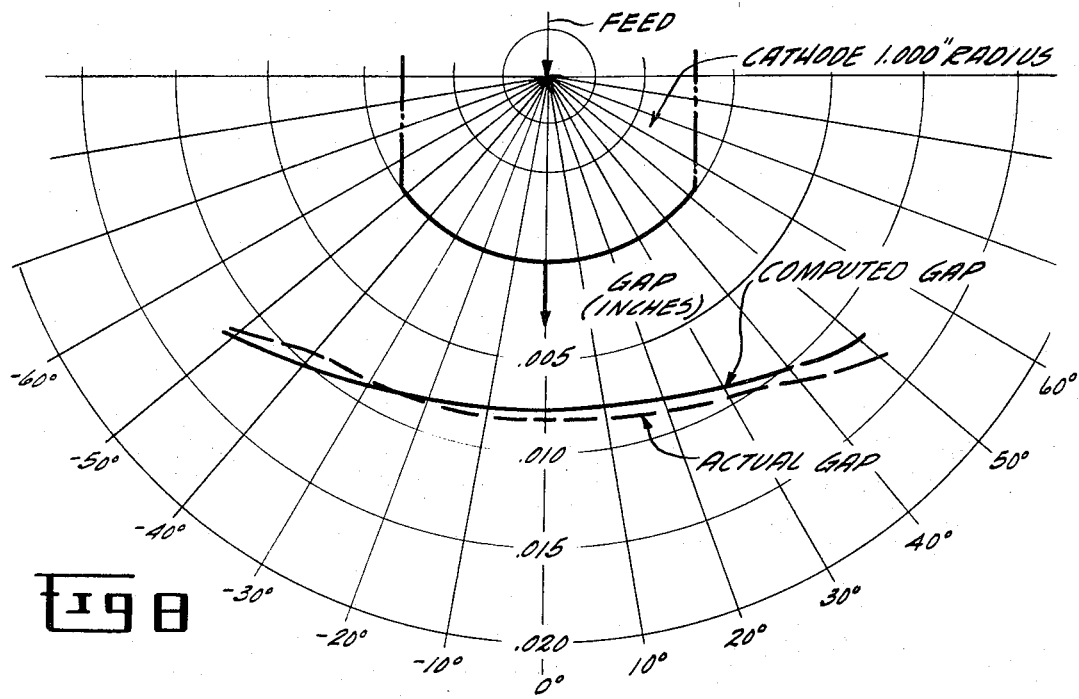
Figure 9:
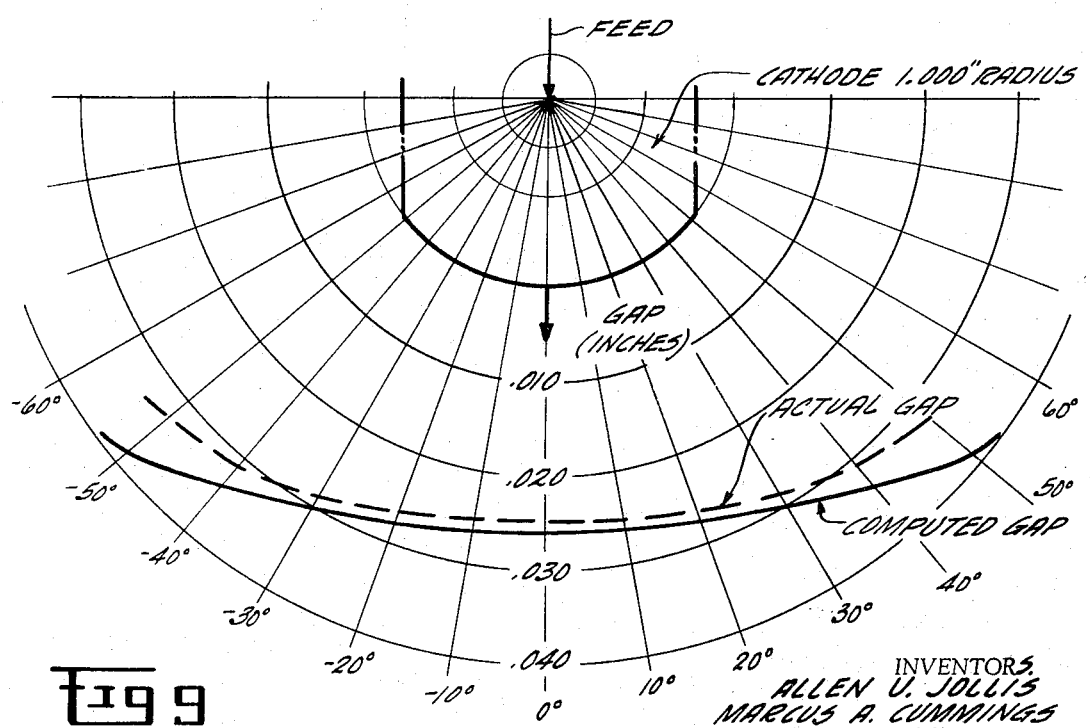

In the drawing:
FIG. 1 is a diagrammatic sectional view of an anode and cathode in electrolytic processing relationship;
FIG. 2 is a graphical comparison of specific and average values for $\beta$, the "overcut index" factor for electrolytic machining;
FIG. 3 is a graphical comparison of average values for vs. cutting gaps;
FIG. 4 is a diagrammatic sectional view of test apparatus;
FIGS. 5 and 10 are graphical determinations of overpotential values $\Delta E$;
FIGS. 6 and 11 are graphical representations of the line for the metal removal factor K;
FIGS. 7 and 12 are graphical representations for electrolyte specific resistance vs. concentration;
FIGS. 8 and 9 are graphical comparisons on polar coordinates between actual and calculated operating gaps;
FIGS. 13 and 14 are diagrammatic sectional views of an electrode in electrolytic processing relationship at time "0" and at time "$t$" respectively.

Briefly, the present invention generally provides a method for determining, in electrolytic machining, such variables as the cutting gap and cutting time based on a method for predicting the total effect of current flow in electrochemical processes. Primarily the specific prediction is a comparison of the direct effect with either the side effect of "overcut" in electrolytic machining or the "edge or corner effect" in electrodeposition. The method thus provides information to allow accurate design of tools and determination of excess workpiece stock required. In one aspect, the present invention can be interpreted with regard to electrolytic machining as establishing an "overcut index" for use in process design.

The present invention provides a method in which the operating gap $L_{11}$ at any incremental point between two electrodes in an electrochemical process, either steady state or transient, is determined from the relationship of the geometry of a plurality of surface increments ($A_{ij}$) on the electrodes including each increment's distance ($L_{ij}$) at any time from the other electrode, related to the effective voltage between the electrodes ($E-\Delta E$), electrolyte specific resistance ($\rho$) and the metal removal characteristics (K) of the electrolyte-workpiece material system according to the relationship:

$$L_{11} = \frac{L_{11}^*}{2} + \frac{1}{2}\left[L_{11}^{*2} + \frac{4A_{11}}{\dfrac{A_{eip}}{(E-\Delta E)Kt} - \sum_{j=2}^{m} \dfrac{\frac{1}{2}A_{ij}}{L_{ij}(L_{ij}-L_{ij}^*)}}\right]^{1/2} \quad (1)$$

where:

$L^*_{11}$ is the original starting gap distance normal to the known electrode, in inches;

$L^*_{ij}$ is the original starting gap distance other than normal to the known electrode, in inches;

$L_{11}$ is the operating gap distance normal to the known electrode at any time, in inches;

$L_{ij}$ is the operating gap distance other than normal to the known electrode at any time, in inches;

$A_{ei}$ is an increment of area on the known electrode, in square inches;

$A_{ii}$ is an increment of area on the other, or unknown electrode, in square inches;

$A_{ij}$ is the cross-sectional area of a projection of either $A_{ei}$ or $A_{ii}$ on one electrode to the other, in square inches;

E is the applied electrical potential in volts;

$\Delta E$ is threshold voltage which must be applied before electrolysis can proceed, in volts;

$\rho$ is the specific resistance of the electrolyte, in ohm-inches;

K is a constant for the metal being removed or deposited, in cubic inches per ampere minute;

$t$ is time, in minutes;

$$\sum_{j=2}^{m}$$

is the summation of all increments to $m$ not including the direct effect $j=1$;

$i=1, 2, \ldots n$, and $n$ is the number of surface increments on an electrode;

$m=$ those increments included in the stray effect out of a total of $n$ increments.

In its broadest form, the present invention, expressed in one form by the mathematical relationship above, relates to electrochemical processes in general. However, it is readily adaptable to and will find most immediate application in the electrolytic material removal process. The electrolytic material removal process and particularly electrolytic machining has been widely described and studied. However, the present invention is the only analytical method, verified as shown below, and now available for accurate process simulation, for accurate design of electrode-cutting tools as well as for accurate determination of workpiece excess machining stock.

This invention can also be used for the programming of adaptive control methods. For example, by placing restraints on the $L_{11}$'s and monitoring the input parameters, cathode feed rates and workpiece removal rates can be maximized.

In one most commonly used electrolytic machining process, the cathode-tool and the anode-workpiece, which face one another across a cutting gap, are connected to a direct current power supply as electrolyte passes through the cutting gap. Metal dissolves from the anodic workpiece and is carried away by the electrolyte. Associated with this type of process and its equipment in practical applications are such inter-related apparatus systems as (1) variable electrical power supplies because of different requirements for different electrolytes and workpiece material systems, (2) electrolyte supply and pumping systems to provide variation in electrolyte pressure, velocity and temperature as required by the particular application, (3) means such as a machine tool to feed the cathode-tool and the anode-workpiece one toward the other as metal is dissolved from the anodic workpiece and (4) various cathode-tool designs to confine the current flow and direct it appropriately between the cathode-tool and anode-workpiece. Consequently, there are a number of operating parameters which can be arbitrarily assigned to be used in an electrolytic machining process.

Once the operating parameters are assigned, there results a number of response variables which depend on the operating parameters and the inherent properties of the workpiece and the equipment. The performance of electrolytic machining is governed by a large number of process parameters most of which vary with changes in workpiece material or electrolyte as well as the size and shape of the desired machining cut. A number of explanations and discussions have been presented theorizing on the importance and need for the control of one parameter or a group of particular parameters over the rest. For example, it has been stated that the adjustment of electrolyte velocity is the most important factor in the process. Still other prior discussions dealing with the reproduction of intricate electrode shapes maintain that the resolution of the shape improves with increased feed rates. Thus bits and pieces of the electrolytic machining process parameters and some of their inter-relationships have been described in the prior art. However, an accurate method for controlling and designing electrochemical processes such as electrolytic machining processes with its complicated inter-relationships of variables and the associated equipment and tooling has not heretofore been recognized.

It was unexpectedly discovered that by comparing the total effect of current field with the spray or side effect between a cathode and an anode in an electrolytic process and relating that comparison to certain parameters, the geometric relationship between the electrodes can be accurately predicted and the shape of an electrode-tool can be accurately designed. An important feature of the method of this invention includes a factor, hereafter referred to as beta ($\beta$), which reflects the comparison of side and total effects. This factor is the "overcut index" for electrolytic material removal and the "overthrow index" for electrolytic material addition.

FIG. 1 shows the first and the $n^{th}$ increments of an anode and a cathode. The direct effect of a current field between electrodes 22 and 24 is that effect along a line such as $L_{11}$ or $L_{n1}$ directly opposite or normal to an incremental area of the electrode 22. Such an area is represented by rectangle $A_{e1}$ or $A_{en}$ in a grid system shown generally at 20. The side or stray effect is the effect that surface area or increment $A_{e1}$ of electrode 22 has on the other electrode 24 such as along the line $L_{1j}$ across a cross-sectional area $A_{1j}$. Thus the plurality of stray effects each incremental area has on the opposite electrode is represented by $L_{ij}$ for the distance and $A_{ij}$ for the cross-sectional area. The total of the stray effects for "$m$" increments is the sum from $j=2$ to $m$, with $j=1$ the direct effect.

In connection with this geometric relationship, based on the unexpected recognition of the factor "beta" ($\beta$), the dependence on other parameters was investigated. Beta was unexpectedly recognized to be a function of geometry only: gap or separation distance and electrode areas. It was also unexpectedly found that when the major or direct effect of current field was separated from the side effect, the surface configuration of either electrode could be defined by describing the distances required between a plurality of points on the electrodes.

The present invention, in one aspect, comprises a method for determining the cumulative effect of a plurality of cell increments such as $A_{ei}$, or a plurality of separate electrodes or increments thereof, on the other electrode thus to define the operating parameters controlling electrochemical processes.

The first step in the method of this invention is to select from the literature or to determine by simple experiments certain process variables specific for a given material-electrolyte system in a manner described later in detail in the examples. However, the present invention will perhaps be more readily understood by those familiar with the art by expressing the relationships among the variables in a general electrochemical process by a mathematical relationship. This is the mathematical way of expressing the relationships in the method of the present invention. As was mentioned above, a general mathematical relationship of the present invention which will apply to steady state as well as transient conditions can be expressed as shown in Equation 1 above.

This relationship, the meaning and dimensions of the terms of which have been previously listed, can be used by solving for distances $L_{ii}$ to determine such variables as (a) cutting gaps, and hence electrode shapes, (b) cutting time for the electrolyte machining cases where no external feed is applied (dwell cutting), (c) electrolytic machining with variable applied feeds as well as, broadly, (d) a variety of information relating to electrodeposition and electropolishing. Any desired dimensional tolerance can be achieved through mathematical iteration by using Equation 1 in the form of $$\Delta L_{ii} = \frac{L_{ii}^*}{2} + \frac{1}{2}\left[L_{ii}^{*2} + \frac{4A_{ii}}{\frac{A_{ei}\rho}{(E-\Delta E)K\Delta t} - \sum_{j=2}^{m}\frac{A_{ij}}{L_{ij}(L_{ij}-L_{ii}^*)}}\right]^{1/2} \quad (2)$$

In such a case, for each of a successive plurality of incremental time periods $t$, the mathematical iteration is continued until $L_{ii}$ is in error by an allowable error $\Delta L_{ii}$, for example 0.0000001 inch as shown in the following examples. More specific forms of these relationships will be more fully discussed particularly in connection with specific examples.

As can be recognized from the above Equations 1 and 2, all of the variables can be readily obtained in each desired case by a (a) geometric measurement, (b) simple experimentation which will be described in detail later in the examples or (c) from the literature. The summation term or stray effect to the right in the denominator of Equations 1 and 2 can be solved to provide the required answer.

The above Equations 1 and 2 are based on a consideration of Ohm's Law and Faraday's Law as applied to electrochemistry. In Ohm's Law, $E-\Delta E=IR$ for $E-\Delta E>0$ where $E$ and $\Delta E$ are as defined above, $I$ is current in amperes and $R$ is resistance in ohms. In electrochemistry, $\Delta E$ represents the threshold voltage which must be applied before electrolysis can proceed. During electrolysis, chemical reactions occur which may produce, among other things, hydroxyl ions, hydrogen gas and elemental metals at the cathode and either or both metal ions and oxides at the anode. Consequently, there is a change in resistance which contributes to the threshold voltage $\Delta E$ in regions between the cathode and anode. This effect has been recognized and reported in the literature.

Because the applied electropotential $(E-\Delta E)$ and current $(I)$ are established for each electrochemical production process, it has been found that for electrolytic machining the total effective $\Delta E$ can be determined by plotting the imposed voltage $(E)$ against the current flow $(I)$ in a manner shown in detail in connection with FIG. 5 and Example 2. Therefore the $(E-\Delta E)$ term is readily obtainable. The specific resistance $(\rho)$ for an electrolyte can readily be determined at various temperatures with a standard conductivity cell or frequently from the literature for some specific electrolytes. The metal removal factor $K$, discussed more completely in connection with FIG. 6 and Example 2, can be estimated by plotting feed rate against current density for steady state machining conditions. Thus the process variables $\Delta E$, $\rho$ and $K$ for each workpiece-electrolyte combination required in the practice of this invention as shown in general Equation 1 of the mathematical form of the method of the present invention, are all readily obtainable experimentally or from the literature. The other terms of the model are geometric conditions which can be described.

In steady state operation for electrolytic machining, the distance between the cathode and anode remains the same because the feed rate is equal to the metal removal rate.

Equation 1 can be simplified and the following relationship between electrode shape, feed rate and the process variables $E$, $\Delta E$, $\rho$ and $K$ exist.

$$\sum_{j=1}^{m}\frac{A_{ij}}{L_{ij}} = \frac{F_i A_{ei}}{\frac{E-\Delta E}{\rho}K} \quad (3)$$

Another way of stating this relationship is as follows:

$$\frac{A_{ii}}{L_{ii}} + \sum_{j=2}^{m}\frac{A_{ij}}{L_{ij}} = \frac{F_i A_{ei}}{\frac{E-\Delta E}{\rho}K} \quad (4)$$

in which $F_i$ is the applied feed rate in the direction of the normal $L_{ii}$ in inches/min.

In the above Equation 4, the first term represents the direct effect. The second term, summing the effects except the direct effect, is the stray effect from the principal point of measurement to the total number of points $(m)$ selected for measurement. The total of these two terms determines the total electrolytic processing effect. By taking a ratio of stray effect to the total effect, the overcut index beta $(\beta)$ is defined in the following way:

$$\beta = 1 - \frac{\sum_{j=2}^{m}\frac{A_{ij}}{L_{ij}}}{\sum_{j=1}^{m}\frac{A_{ij}}{L_{ij}}} \quad (5)$$

This relationship was developed when it was recognized unexpectedly that the overcut index beta is a function only of the distances $L$ and of electrode areas $A$. When the stray effect is very small compared with the direct effect as in very close gaps between a cathode and an anode, the value of $\beta$ approaches 1 and the stray or side effect on the gap or cathode determination approaches 0. The relationship will be more clearly understood from the following example.

EXAMPLE 1

In this experiment, the shape of the cathode was fixed rather than the anode because the effect of operating conditions on metal removal under different electrolytic operating conditions was the characteristic of interest. Furthermore, it was more practical to discard the anode-workpiece rather than to reshape the cathode-tool for each condition studied. It will be understood, however, that by selecting an anode shape and reworking the cathode for each specific operating condition, the same results can be obtained.

The cathode-tool was made from a sintered copper-tungsten alloy sold by P. R. Mallory Company as Elkonite 30W3 alloy. The shape was fixed as a simple segment of a cylinder with a radius of 1.0000″, a chord of 1.509″ and a width of 0.920″. The surface of this tool and the cooperating workpiece each were divided into a grid of 319 points formed by the intersection of 29 "$y$" axis lines and 11 "$x$" axis lines. Thus the area A assigned to each point was fixed.

From each point on the cathode, normals to the workpiece-anode determined the $L_{ii}$ distances for each point, for example $L_{ii}$ in FIG. 1, and directional cosines were calculated to determine the $L_{nj}$ and $A_{nj}$, for example $L_{ij}$ and $A_{ij}$ in FIG. 1, for each point relating to the stray effect between the electrodes. The following Table I represents typical conditions used and data obtained from the workpiece materials, electrolyte and test conditions in this example series of tests.

TABLE I

| Operating Parameters | René 41 Mat'l Test No. | | | | | A286 Mat'l Test No. | | |
|---|---|---|---|---|---|---|---|---|
| | C1 | C3 | C4 | C5 | C6 | D1 | D2 | D3 |
| Electrolyte composition | NaCl | NaCl | NaCl | NaCl | NaCl | NaNO$_3$ | NaNO$_3$ | NaNO$_3$ |
| Electrolyte concentration (lb./gal.) | 2.1 | 2.1 | 2.1 | 2.1 | 2.1 | 5.0 | 5.0 | 5.0 |
| Electrolyte temperature, tank (° F.) | 94 | 94 | 94 | 94 | 94 | 100 | 100 | 100 |
| Electrolyte temperature rise [1] (° F.) | 6.5 | 11.0 | 2.0 | 6.0 | 6.0 | 4.0 | 11.0 | 15.0 |
| Applied feed (in./min.) | .040 | .060 | 0.20 | .040 | .060 | .020 | .040 | .060 |
| Applied voltage (volt) | 11.0 | 14.5 | 6.0 | 8.0 | 11.0 | 14.0 | 12.0 | 16.0 |
| Cutting time (min.) | 4.75 | 3.15 | 9.5 | 4.75 | 3.15 | 25.0 | 12.5 | 8.33 |
| Average current [2] (amp.) | 663 | 957 | 333 | 619 | 917 | 426 | 736 | 1,087 |
| Electrolyte pressure, inlet [2] (p.s.i.g.) | 240 | 240 | 200 | 240 | 275 | 240 | 240 | 240 |
| Electrolyte pressure, outlet [2] (p.s.i.g.) | 20 | 20 | 40 | 20 | 20 | 20 | 20 | 20 |
| Electrolyte flow [2] (g.p.m.) | 4.4 | 4.5 | 2.4 | 2.7 | 3.4 | 8.9 | 3.6 | 3.6 |

[1] Average values measured in exit channel of machining fixture.
[2] Average values at end of machining cycle.

Although calculations were made for the entire grid system, verification and comparison measurements were made only along the center mesh line 6 of the "x" axis through the center of the grid. The cutting gaps tested for each set of conditions are shown in the following Table II.

TABLE II

| Test No.: | Range of gaps, inches |
|---|---|
| C1 | .0122–.0182 |
| C3 | .0116–.0172 |
| C4 | .0095–.0140 |
| C5 | .0076–.0112 |
| C6 | .0080–.0118 |
| D1 | .0257–.0388 |
| D2 | .0098–.0125 |
| D3 | .0096–.0123 |

The overcut index beta was then calculated for each of the test points and plotted against each cutting gap resulting in a series of graphs one of which is shown in phantom in FIG. 2 for test C3. Superimposed over the test data represented by the line in phantom in FIG. 2 is the solid line representing, for electrolytic machining, the average overcut index, beta, determined from all of the tests. The close correlation between the actual data for this test and the average data for all tests is readily noted except for points at the corner of the cathode. However, it can also be seen in FIG. 2 that when each incremental point on one electrode is affected by an equal number of increments on the other electrode, such as along flat planes on the inside of an electrolysis gap, the overcut index $\beta$ is dependent only on the cutting gap. When the effective area on one electrode is different from the affected area on the other electrode as for example at the edges of the electrodes or in the vicinity of abrupt discontinuities on one or both electrode surfaces, the overcut index $\beta$ is also dependent on the effective areas. Such a point for $\beta$ can be seen in FIG. 2 at a gap of approximately 0.0175" for test C3. This point deviates significantly from the average $\beta$ and represents the calculated overcut index at the edge of the electrodes along mesh line 6 of the "x" axis through the center of the grid. Deviations from the averages were calculated for all cases tested. But they were found to exist only at the edges of the electrodes, or for approximately 22 of the 319 grid point values calculated.

FIG. 3 represents all of the data calculated from these verification tests. It shows clearly the unexpected result that the overcut index beta is independent of any of the variables of the tests discussed above and shown in the above Tables I and II. That is, beta was shown to be independent of materials, electrolytes, temperatures, applied voltages and electrolyte pressure. Thus although the method of the present invention recognizes the interdependence of a number of variables in an electrolytic process, it was unexpectedly recognized that the stray effect between an anode and a cathode in an electrolytic process such as electrolytic machining is solely a function of the geometry of the electrolytic cell.

The tests performed in this example were conducting using apparatus shown in FIG. 4 in which 26 is the cathode-tool and 28 is the workpiece-anode held by holder 30. Machine ram 32 moves cathode 26 toward workpiece 28 with the gap between the cathode and workpiece being measured by measuring pin 34 and registered on indicator 36. Electrolyte flow, shown by arrows 38, passes between the electrodes at gap 40.

With the recognition of $\beta$ as a function of geometry, the practice of the method of the present invention can be simplified for steady state operation at each incremental point and the general Equation 1 above can be rewritten as:

$$\frac{A_{i1}}{L_{i1}} = \frac{F_i A_{ei}}{\frac{E - \Delta E}{\beta_i \rho} K} \quad (6)$$

For mathematical iteration purposes, the change in $L_{i1}$ or $\Delta L_{i1}$ can be expressed $$\Delta L_{i1} = \left[ \frac{A_{i1}}{\frac{F_i A_{ei}}{E - \Delta E} - \beta_i} \right] - L_{i1} \quad (7)$$

Thus one form of the method of the present invention for steady state operation in electrolytic machining to determine the shape of a tool-cathode with respect to the desired shape of a workpiece-anode is first, to determine the process variable $\Delta E$, $\rho$ and $K$; second, to assign selected operating parameters E, the applied voltage and F, the electrode feed rate; third, to divide the electrode into a grid system; fourth, to describe the operating distances $L_{i1}$ between points of intersection of the grid and the opposite electrode according to the relationship shown in the multiple Equations 7; and then to determine the shape and contour of the cathode-tool from a plurality of the operating distances. This method will be more clearly understood from the following detailed example.

EXAMPLE 2

The purpose of this example is to show the mathematical definition of the cutting gaps between a simple cathode and an anode under steady state electrolytic machining conditions according to the method of the present invention and to verify that definition with actual data. For steady state conditions, the relationships in the method of the present invention particularly for determining electrode shape are stated in Equation 6 which involves the solution of $n$ simultaneous equations. In order to determine $L_{i1}$ or the gap at a given point between the anode and cathode, the process variables $\Delta E$, $\rho$ and $K$ must first be determined either from the literature or experimentally.

Assuming that such process variable information is not available in the literature, tests to identify experimentally the significant operating parameters and response variables were conducted. The tests were under steady state conditions on simple test apparatus which used planar electrodes whose surfaces were parallel and equal in area. The apparatus included means to move the electrodes one toward the other while electrolyte was passed between the electrodes and ordinary means to measure the process variables. The operating parameters were held constant and at levels so that the response variables such as cutting gap, electrolyte velocity and electric current, would not vary during the tests.

The workpiece-anode used was a flat surface 0.250" x 0.125" of a nickel base material having a composition, by weight, of 18–20% Cr; 10–12% Co; 9–10.5% Mo; 0.1% C; 3–3.3% Ti; 1.4–1.6% Al; 0.007% B with the balance Ni and up to 0.5% each Si and Mn and up to about 5% Fe, sometimes referred to commercially as Rene 41 nickel base alloy. The cathode-tool used was a flat surface 0.250" x 0.125" of free cutting brass. The electrolyte was an aqueous solution of NaCl.

The estimate of a single or universal value for threshold voltage $\Delta E$, which it has been found can be associated with a variety of applied voltages E, can be accurately made by plotting a series of applied voltages (E) against the current flow (I) for different gaps between cathode and anode. The data from this test is shown in FIG. 5 for NaCl at 2.75 pounds per gallon at a temperature of 85° F. When the straight lines through the data points were extended for each gap distance tested, they intersected with the ordinate and the intersected value is the value $\Delta E$. In this case, the value for $\Delta E$ is 2.6 volts. Analysis has shown that the variation in $\Delta E$ is significantly smaller than the variation due to lack of fit of the straight line in the test series. Therefore, it is shown that $\Delta E$ can be considered constant for the current densities used in electrolytic machining with rapidly flowing electrolytes for this alloy-electrolyte system tested. $\Delta E$ is independent of gap and feed rate. Thus through the use of simple flat electrodes, fed one toward the other, the value for $\Delta E$ can be closely estimated.

The metal removal factor K can be estimated from this same test if the feed rate is plotted against the current density for steady state machining conditions. The graph of FIG. 6 for this same electrolyte-workpiece combination is a plot of the data obtained at electrolyte concentrations of 1.4, 2.0 and 2.3 pounds per gallon at temperature levels of 80, 85 and 120° F. It is to be noted that the data points all fall on the straight line, the slope of which represents an estimate of the metal removal factor K for the alloy-electrolyte combination under the conditions investigated. In this example, $K=0.92\times10^{-4}$ in.$^3$/amp. min.

Thus the metal removal factor K for any specific alloy-electrolyte system can be considered constant at the current density range used in these tests. In electrolytic machining applications K can be considered constant for current density ranges above about 100 amp./in.$^2$. Further tests have shown that the K factor for a given alloy-electrolyte composition is independent of the operating parameters, including electrolyte concentrations. Therefore, it can be considered a constant parameter for a given alloy-electrolyte system.

The metal removal factor K can be estimated for any current range using Faraday's Law as $$K_f = w/Zfd \tag{8}$$

in which $w$ is atomic weight
$Z$ is average valence change in electrolysis
$f$ is Faraday's constant
$d$ is density of the material However, determining the accurate valence changes occurring in electrolysis is very difficult for complex alloy systems.

The specific resistance ($\rho$) of an electrolyte is defined as the resistance of a unit cube of the electrolyte, the reciprocal of which is specific conductivity. The resistance or the conductivity of an electrolyte depends upon temperature, composition, concentration and aging of the electrolyte. Much data with regard to specific resistance is available in the literature. However, if such information is not available, the resistance can be determined with a standard conductivity cell. In pure electrolytes, the specific resistance and consequently the specific conductivity varies only with temperature and concentration. A typical plot for NaCl for use at about room temperature (72° F.) is shown in FIG. 7. In the case of neutral electrolytes, the conductivity stabilizes as the electrolyte ages. However, as an acidic or basic electrolyte is used, its conductivity changes and should be determined in a conductivity cell. Once the factors $\Delta E$, K and $\rho$ have been determined either from the literature or by experiment and operating parameters have been assigned, the next general step in the method of the present invention is to divide the known electrode, $A_{el}$ into the grid system described in Example 1 above. In this case the cathode was used for ease of testing and verification. Then the distances or gaps $L_{11}$ for a series of selected feed rates and voltages were calculated mathematically. In this example, data was used from Table I for NaCl and the Rene 41 alloy with Equations 6 and 7 for steady state operation to reach a $\Delta L_{11}$ error less than 0.0000001 inch. The feed rates used in this example are those listed in Table I. The calculated gaps for each test shown in Table I were recorded and plotted on polar coordinate graphs. One of these, for test C–5, is shown in FIG. 8 identified as "Computed gap."

In order to verify the computed or calculated results, actual electrolytic machining was conducted under the same steady state conditions described in connection with the calculation experiment. The gaps from actual experiment were plotted with the calculated gaps for comparison purposes. Referring to FIG. 8, the extremely good correlation between calculated gaps and actual gaps can easily be seen. Thus the present invention provides a reliable method for determining operating cutting gaps in electrolytic machining and hence the desired contour of a cathode to be used or the resultant anode which will be obtained in electrolytic machining. For steady state operation all that is needed are the geometric description of the desired anode shape or the imposed cathode shape and the readily obtainable values for $\Delta E$, $\rho$ and K, the term $\beta$ described in Example 1 and any selected practical feed rate and applied voltage for the electrolyte-workpiece-apparatus system.

EXAMPLE 3

Using the same apparatus and procedures as in Example 2, tests were conducted on an iron base material having a nominal composition, by weight, of 0.08% C; 1.4% Mn; 1% Si; 15.5% Cr; 26% Ni; 1.25% Mo; 2.0% Ti; 0.3% V; 0.2% Al with the balance Fe, sometimes referred to commercially as A–286 alloy. In this example, the electrolyte was an aqueous solution of NaNO$_3$ at 5.0 pounds per gallon.

The estimate of a single value for threshold voltage $\Delta E$ was made by plotting a series of opposed voltages (E) against the current flow (I) for various gaps between cathode and anode. The data from these tests are shown in FIG. 10 for temperatures of 85° F. and 100° F. When the straight lines through the data points were extended for each distance tested, they intersected with the ordinate at a value between 3.4–3.9 as shown in FIG. 10. As was pointed out in Example 2, $\Delta E$ can be considered constant for this alloy-electrolyte system tested.

The metal removal factor K was estimated by plotting feed rate against current density as shown in FIG. 11 at temperatures between 85–100° F. It is to be noted that the data points, as in the case of Example 1, all fall on a straight line. The slope of such a line represents an estimate of the metal removal factor K in electrolytic machining with rapidly flowing electrolyte (e.g. more than 10 ft./sec.) for this alloy-electrolyte system. In this example, $K = 0.80 \times 10^{-4}$ in.³/amp. min.

The specific resistance value $\rho$ was determined with a standard conductivity cell and plotted as in FIG. 12.

With the factors $\Delta E$, $K$ and $\rho$ determined, the electrode was divided into the grid system as described above. The distances or gaps $L_{i1}$ for a series of selected feed rates and voltages were calculated mathematically in this example by using the data from Table I for NaNO₃ and A286 alloy with the Equations 6 and 7 for steady state operation to reach a $\Delta L_{i1}$ error of less than 0.0000001 inch. The feed rates used in this example are those listed in Table I. The calculated gaps for each test were recorded and plotted on polar coordinate graphs. One of these, for test D–1 is shown in FIG. 9 identified as "Computed Gap."

In order to verify the calculated results, actual electrolytic machining was conducted on the apparatus of FIG. 4 under the same conditions. The gaps from the actual experiment were plotted with the calculated gap for comparison purposes. Referring to FIG. 9 again the extremely good correlation between calculated gaps and actual gaps as can be seen, as was the case in Example 2 above (FIG. 8).

EXAMPLE 4

Another example of practical use for the present invention in the field of electrolytic material removal involves the determination of the minimum excess machining stock and respective machining time necessary to achieve a desired anode-workpiece contour under specific operating conditions and with a given cathode-tool. This invention provides an improved method for determining the necessary machining stock and machining time.

It is the practice to define articles or article surfaces by nominal dimensions and by a tolerance band $e_i$ within which a surface may deviate from its nominal shape. When such a nominal surface and tolerance band are known for both the raw material configuration and for the desired finish shapes, the present invention as represented by Equations 1 and 2 can be used to calculate the minimum amount of excess machining stock and machining time.

First the factors $\Delta E$, $K$ and $\rho$ are determined, either from the literature or from experiment such as described above. Then a cathode-tool feed and an operating voltage are selected and the cathode is divided into the grid system described in Example 1. The fourth general step is to describe two raw material surfaces by the distances $L^*_{i1\ min}$ and $L^*_{i1\ max}$. This is done with respect to a known cathode-tool, such as in FIG. 13, where $$L^*_{i1\ max} - L^*_{i1\ min} = e_i^*$$

the known tolerance band around the nominal raw material surface, and the initial gaps $L^*_{i1\ min}$ range within certain limits which are known from experience to be practical for a metal-electrolyte system. For example, in the René 41 alloy-NaCl solution electrolyte system of Example 2, practical limits of initial gaps $L^*_{i1\ min}$ are known to be about 0.002″–0.030″.

Next, the minimum and maximum distances $L_{i1}$ which exist after operating or processing time $t$, such as in FIG. 14, are calculated with Equations 1 and 2 by mathematical iteration both with respect to the raw material surfaces described by the initial distances $L^*_{i1\ max}$ from the cathode to the minimum stock condition, and $L^*_{i1\ min}$ from the cathode to the maximum stock condition until the $\Delta L_{i1}$ error for each calculation is less than, for example, 0.0000001″. The resultant surfaces $A_{i1\ max}$ and $A_{i1\ min}$, described by the distances $L_{i1\ min}$ and $L_{i1\ max}$ respectively, are then compared to each other. Then if either the nominal surface or the desired tolerance has not been achieved within operating time $t$, the cathode position is adjusted by a feed length $s$. Thus, there are established the same gap limits $L^*_{i1\ min}$ from the cathode-tool to the newly created maximum stock conditions as were used in the first calculating step. Further, the ratio of $s/t$ is compatible with the rate of the selected electrode feed F for which the cathode has been established.

The calculating procedure is then repeated for sufficient time periods $t$, each associated with an adjustment of the cathode by a feed length or stroke "$s$," until the resultant minimum and maximum stock conditions, $A_{i1\ min}$ and $A_{i1\ max}$, fall within the desired contour band for the final shape and tolerance. When this is accomplished, the summation of all time periods $t_n$ is the minimum machining time. The minimum excess machining stock $X_i$ required for each surface increment $A_{i1}$ on the anode-workpiece for a given cathode-tool and operating conditions is described by the summation of all feed lengths $s$ added to the difference between the distance $L^*_{i1\ max}$ at the start of the operation and the distance $L_{i1\ max}$ at the end of the operation. This can be described by the relationship:

$$X_i = \sum_{1}^{n}(S_n) + [(L^*_{i1\ min}\ \text{at}\ t=0) - (L_{i1\ min}\ \text{at}\ t=n)]$$

(9)

EXAMPLE 5

Another example of a practical use for the present invention involves determination of metal removal rate. This invention provides an improved method for maximizing metal removal rates involving first the selection of an operating gap range between the cathode and the anode within certain limits which are known from experience to be practical for a metal-electrolyte system. For example, in the René 41 alloy-NaCl solution electrolyte system of Example 2, practical limits on gaps are known to be about 0.002″–0.030″. With the application of such a restraint on the variation of $L_{i1}$ in Equations 6 and 7, the metal removal rates can be maximized so as to achieve a desired shape within the shortest period of time.

The present invention has been described in connection with certain specific examples particularly in the field of metal removal. It appears presently that the most unexpected and unusual advances can now be made in the metal removal field as a result of this invention. However, it will be understood by those skilled in the art that the present invention has application to electrolytic processing in general and to materials other than those listed in the specific examples. Such metals or alloys as 8-1-1 titanium alloy, refractory metals such as tungsten, tool steels and stainless steels have been tested in the development of the present invention. There are numerous modifications and variations of which this invention is capable within its broad scope.

What is claimed is:

1. A method for making a working surface of a tool-electrode of electrolytic apparatus for use with a specific metallic workpiece material and a specific electrolyte to produce a known shape of a workpiece electrode surface, the method comprising the steps of:
   (A) producing the threshold voltage ($\Delta E$) and workpiece material constant ($K$) for the specific system of workpiece material-tool electrode material-electrolyte-electrolytic apparatus by producing, under a condition of electrolytic equilibrium, data of voltage, current, operating gap, electrode movement rate one with respect to the other, and current density from a plurality of electrolytic processing steps, the threshold voltage being a function of the voltage, current and gap and the workpiece material constant being a function of the current density and electrode movement rate,
      (1) all of the steps having substantially the same fixed conditions of electrolyte composition, temperature and flow, and
      (2) each step having fixed conditions of voltage, current, gap, electrode movement rate and current density, (3) each step, with respect to the other of the plurality of steps, varying at least one of the conditions of voltage, gap and electrode movement rate while maintaining electrolytic equilibrium
(4) each step comprising:
   (a) placing a first surface of a first specimen of the workpiece material in spaced relation with a second surface of a second second specimen of the tool-electrode so that the first and second surfaces define a uniform gap in the range of 0.002–0.04″;
   (b) flowing the electrolyte at a fixed rate of at least 10 ft./sec. through the gap in contact with both the first and second surfaces;
   (c) passing predominantly direct electrical current between the first and second specimens through the electrolyte in the gap to produce a fixed current density of at least 100 amps/in.$^2$ on the surface receiving current; while at the same time.
   (d) moving the first and second surfaces with respect one to the other at a fixed rate in the range of 0.002–0.2 in./min. to maintain substantially constant the uniform gap between the surfaces during electrolytic processing
(B) graduating a model of the workpiece surface into a first grid of a plurality of incremental plane areas;
(C) graduating the working surface of the tool-electrode into a second grid of a plurality of incremental plane areas equal in number to those of the first grid, the equal numbers of incremental areas on the first and second grids providing pairs of cooperating incremental areas; and then
(D) making the working surface of the tool-electrode by producing each of the plurality of incremental plane areas of the second grid from the distance ($L_{11}$) between each cooperating pair of incremental areas when each cooperating pair of incremental areas are disposed in spaced apart relationship substantially parallel one to the other, the distance ($L_{11}$) being determined from the relationship:

$$L_{ii} = \frac{L_{ii}^*}{2} + \frac{1}{2}\left[L_{ii}^{*2} + \frac{4A_{ii}}{\frac{A_{ei}\rho}{(E-\Delta E)Kt} - \sum_{j=2}^{m}\frac{A_{ij}}{L_{ij}(L_{ij}-L_{ii}^*)}}\right]^{1/2}$$

where:
L*$_{11}$ is the original starting gap distance normal to the known workpiece surface;
L*$_{ij}$ is the original starting gap distance other than normal to the known workpiece surface;
$L_{11}$ is the operating gap distance normal to the known workpiece surface at any time;
$L_{ij}$ is the operating gap distance other than normal to the known workpiece surface at any time;
$A_{ei}$ is an increment of area on the known workpiece surface;
$A_{11}$ is an increment of area on the unknown working surface of the tool-electrode;
$A_{ij}$ is the cross-sectional area of a projection of one of $A_{ei}$ and $A_{11}$ on one electrode to the other;
E is the applied electrical potential;
$\Delta E$ is the threshold voltage which must be applied before electrolysis can proceed;
$\rho$ is the specific resistance of the electrolyte;
K is a workpiece material constant;
t is time of operation;

$$\sum_{j=2}^{m}$$

is the summation of all increments to m not including the direct effect j=1;

i=1, 2, . . . n, and n is the number of surface increments on an electrode;
m=those increments included in the stray effect out of a total of n increments.

2. A method for determining the threshold voltage ($\Delta E$) for a specific electrolytic process system of workpiece material-tool electrode material-electrolyte-electrolytic apparatus by producing, under a condition of electrolytic equilibrium, data of voltage, current and electrode movement rate one with respect to the other from the plurality of electrolytic processing steps of claim 1,
   the threshold voltage being the applied voltage determined from extrapolution of the data to zero amps current.

3. A method for determining the workpiece material constant (K) for a specific electrolytic process system of workpiece material-tool electrode material-electrolyte-electrolytic apparatus by producing, under a condition of electrolytic equilibrium, data of current density and electrode movement rate one with respect to the other from the plurality of electrolytic processing steps of claim 1,
   the workpiece material constant being the substantially linear rate of change between current density and electrode movement rate.

4. The method of claim 1 for making a working surface of a tool-cathode of electrolytic machining apparatus in which:
   the first surface of the first specimen and the second surface of the second specimen in the electrolytic processing steps are substantially flat and parallel one to the other,
   the movement of the first and second surfaces are one toward the other, and
   the direct electrical current is passed between the first and second specimens through the electrolyte in the gap so that the tool-electrode specimen is cathodic with respect to the workpiece material specimen.

5. The method of claim 1 for making a working surface of a tool-cathode of electrolytic machining apparatus, for use in a process of steady state electrolytic material removal, in which in the plurality of electrolytic processing steps, each step, with respect to the other of the plurality steps, varies the condition of gap distance while maintaining the conditions of voltage and electrode movement rate constant.

6. The method of claim 5 in which:
   the gap distance is varied within the range of 0.002″–0.030″; and
   the workpiece material is based on an element selected from the group consisting of Fe, Co, Ni, the refractory metals and Ti.

7. For use in a steady state electrolytic process, the method of claim 1 in which:
   the distance ($L_{11}$) is determined from the relationship $$\frac{A_{11}}{L_{11}} = \frac{F_i A_{ei}}{\frac{E-\Delta E}{\beta_i \rho}K}$$

the direct electrolytic effect ($\beta$) between the working surface of the tool-electrode and the workpiece surface being determined by applying the normal and angular distances between the incremental areas on the first grid and the incremental areas on the second grid in the relationship:

$$\beta = 1 - \frac{\sum_{j=2}^{m}\frac{A_{ij}}{L_{ij}}}{\sum_{j=1}^{m}\frac{A_{ij}}{L_{ij}}} \cdot ---$$

8. The method of claim 7 for use in electrochemical machining in which the working surface of the tool-cathode and the workpiece surface of the anode, other than edge points, have substantially uniform curvature, the total direct electrolytic effect ($\beta$) being selected from the relationship:

$$\beta = 1.0 - 3.2\ L_{i1}$$

9. The method of claim 7 for use in electrochemical machining in which the normal distance between the cooperating pairs of incremental areas is in the range of 0.002–0.030″, and
the material of the workpiece anode is based on an element selected from the elements Fe, Co, Ni, the refractory metals and Ti.

10. The method for making a workpiece raw material blank from a workpiece material having a surface finish with a variation between a known blank minimum and a known blank maximum, the blank having substantially minimum excess material in addition to that required to produce an article surface in an electrolytic machining process using a cathode-tool surface which will produce the article surface with a variation between a known article surface minimum and a known article surface maximum, the article surface being produced under electrolytic machining conditions of given feed rate and operating voltage and using a specific electrolytic machining apparatus, comprising the steps of:

(A) producing the threshold voltage ($\Delta E$) and workpiece material constant ($K$) according to the method described in claim 1;
(B) graduating the workpiece surface into a first grid of a plurality of incremental plane areas;
(C) graduating the cathode-tool surface into a second grid of a plurality of incremental plane areas equal in number to those of the first grid, the equal numbers of incremental areas on the first and second grids providing pairs of cooperating incremental areas; and then
(D) making the workpiece blank including article surface material and minimum excess material by making each of the plurality of incremental plane areas of the first grid from the distance ($L_{i1}$) between each cooperating pair of incremental areas when each pair of incremental areas are disposed in spaced apart relationship substantially parallel one to the other, the distance ($L_{i1}$) being determined from the relationship equation of claim 1 within limits of the variation between the known article surface minimum and the known article surface maximum;
(E) the depth ($X_i$) of the minimum excess material for each incremental plane area of the workpiece surface being the sum of a plurality ($n$) of increments of feed lengths ($s$) of movement of the cathode-tool surface and the workpiece surface one toward the other for the time ($t$) required in the relationship equation of claim 1 to place the distance ($L_{i1}$) within the known variation limits of the article surface according to the relationship $$X_i = \sum_1^n (S_n) + [(L^*_{i1\ min}\ \text{at}\ t=0) - (L_{i1\ min}\ \text{at}\ t=n)]$$

where:
$L^*_{i1\ min}$ is the minimum original starting gap distance normal to the workpiece surface; and
$L_{i1\ min}$ is the minimum gap distance normal to the workpiece surface at time ($t$).

References Cited

UNITED STATES PATENTS

| | | | |
|---|---|---|---|
| 3,058,895 | 10/1962 | Williams | 204—143 |
| 3,095,895 | 6/1963 | Faust et al. | 204—143 |

ROBERT K. MIHALEK, *Primary Examiner.*